Patented Sept. 27, 1949

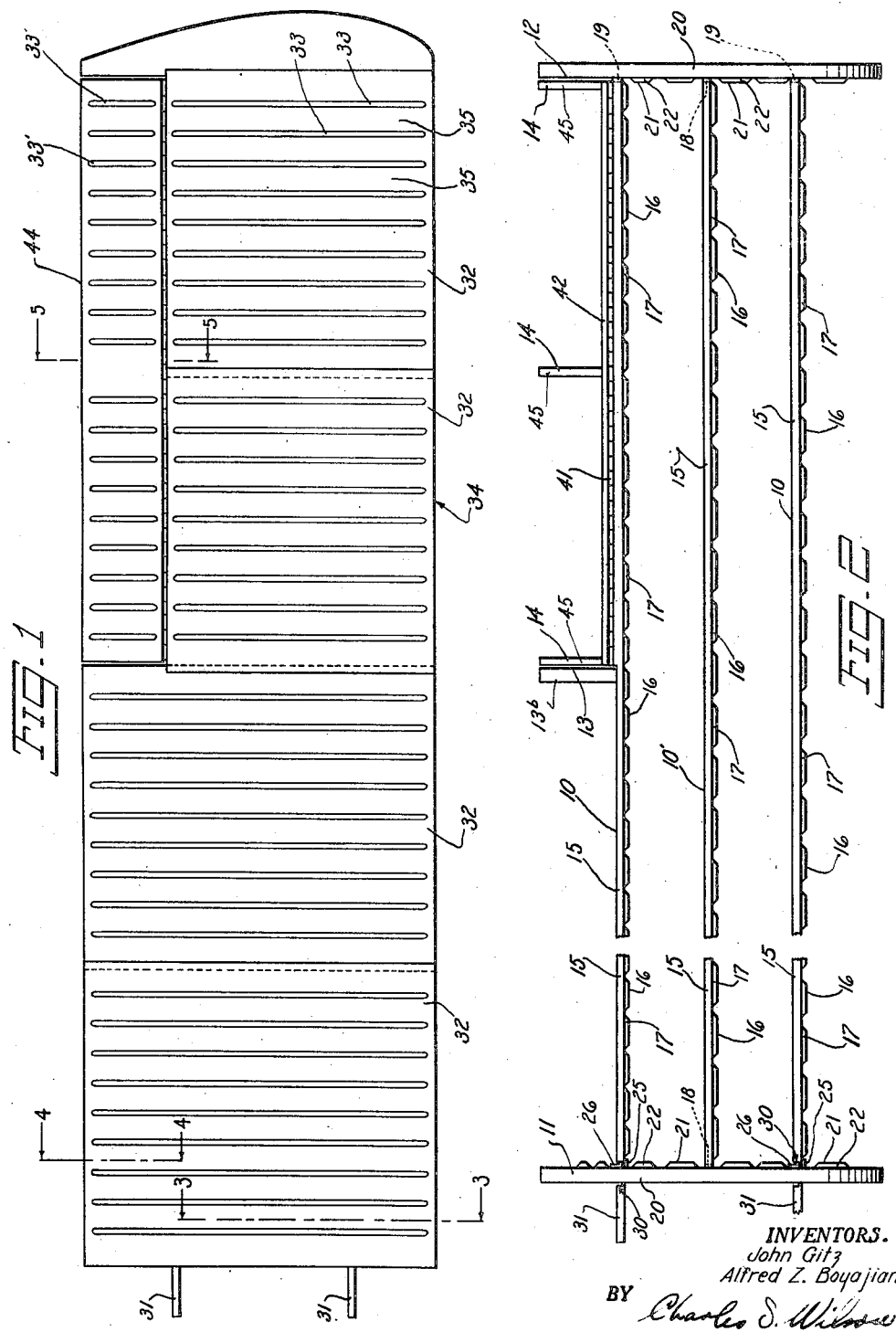

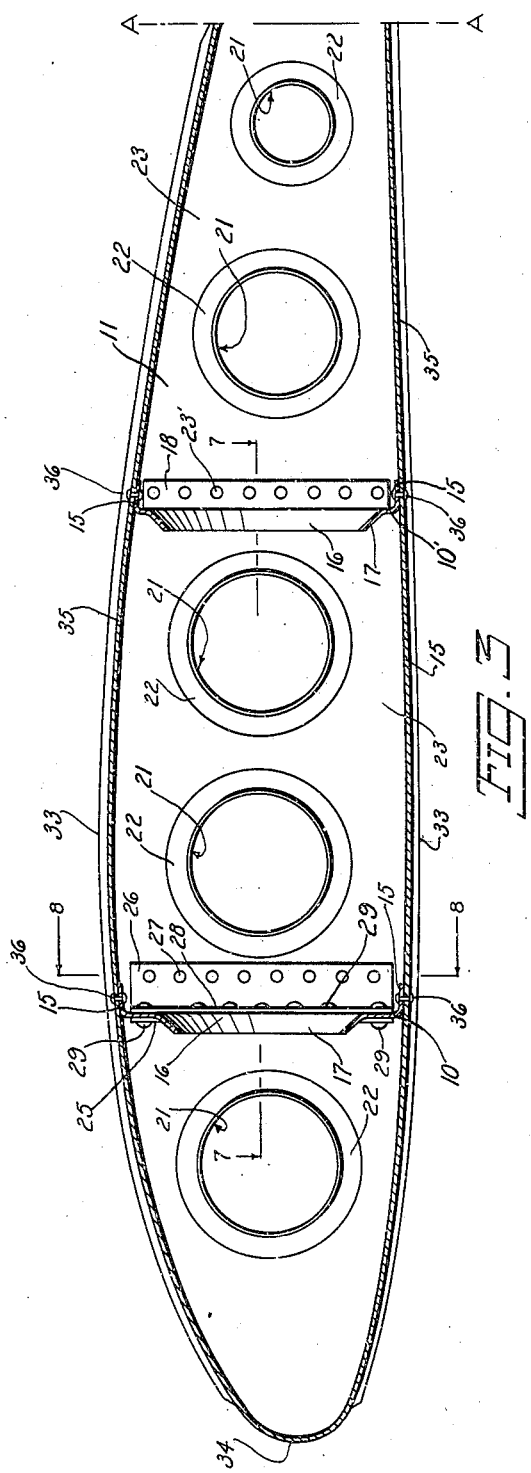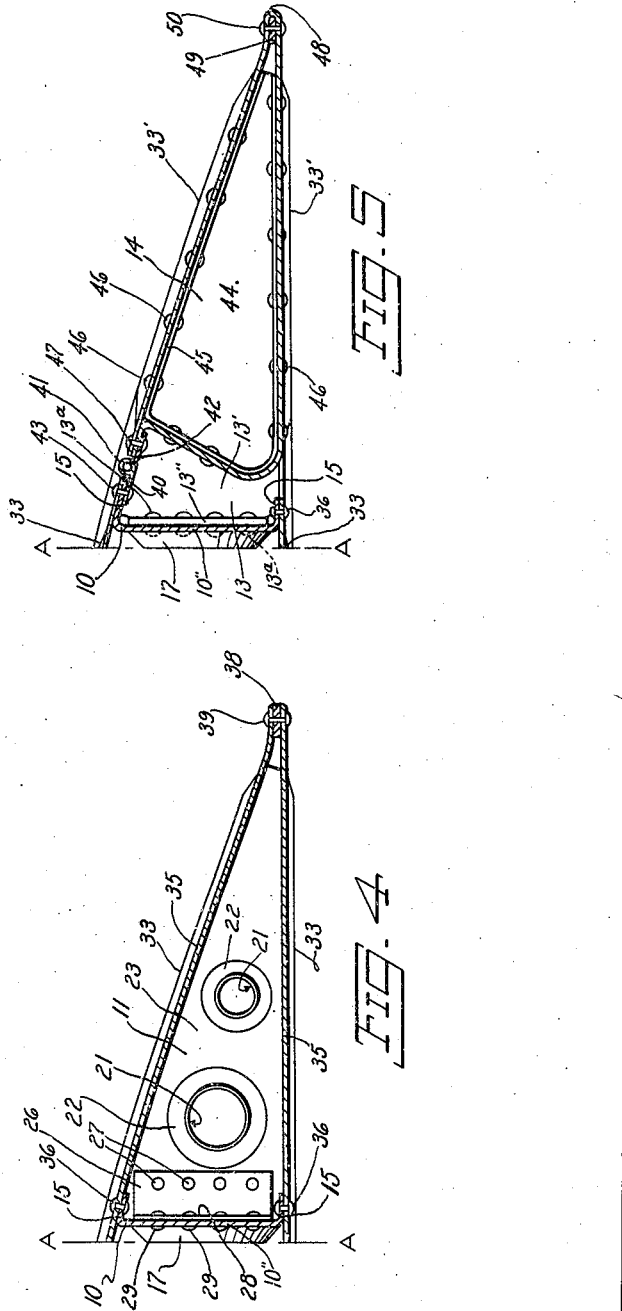

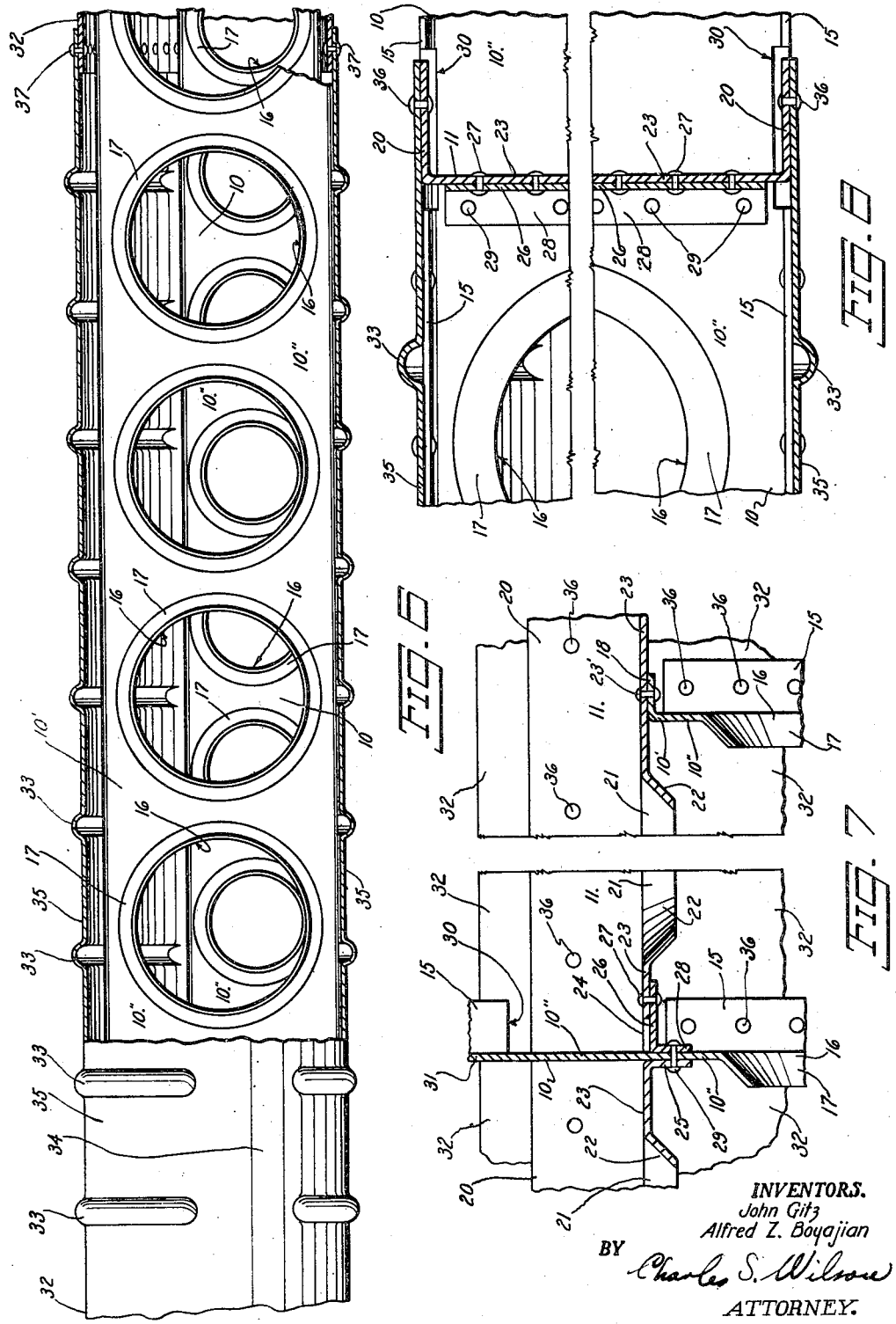

2,483,134

UNITED STATES PATENT OFFICE 2,483,134

AIRFOIL

John Gitz, Roslyn Estates, and Alfred Z. Boyajian, Farmingdale, N. Y., assignors to Republic Aviation Corporation, Farmingdale, N. Y., a corporation of Delaware Application May 1, 1945, Serial No. 591,332

9 Claims. (Cl. 244—123)

This invention relates generally to aircraft structures and more particularly proposes a construction having for its object such simplification of metallic airfoils that the cost of manufacturing and assembling the components thereof is reduced without sacrificing strength or utility.

"Airfoil" as used herein is to include all fixed airfoils such as wings, stabilizers, fins, etc., as well as all movable control surfaces, such as ailerons, flaps, elevators, rudders and the like.

In conventional practice, a metallic airfoil has consisted of a basic framework or skeleton, usually fabricated of several capped spars to which are secured ribs and other trussing or stiffening members, and a sheet metal covering or skin usually in the form of a series of relatively small panels or skin sections overlapped at adjoining edges and secured to said framework. This prior practice is relatively slow, expensive and disadvantageous in that it requires the fabrication and assembly of many separate parts, fittings, cap angles, stringers, etc., the manufacturing, finishing and machining of which is costly and time consuming, and also requires complex riveting and assembling operations occasioned by the numerous elements or parts making up the airfoil and by the relatively small skin panels or sections many of which are rectangular in shape and require riveting or fastening at all four edges.

The present construction contemplates the use of formed sheet metal for the majority, if not all, of the components thereof, and the arrangement and correlation thereof into a simple frame wrapped or enveloped in one or more skin sections or panels, each developed from a single stiffened sheet or section of metal bent upon itself to have its edge portions adjacent to or at the trailing edge of the airfoil.

Basically this airfoil greatly reduces the number of frame elements employed and simplifies the production of each of such elements by employing standard sheet metal forming technique, made possible by the structure of the several frame elements and their cooperation with each other and with the enveloping, stiffened skin. By its simplification and its reduction in the number of elements embodied in the airfoil, the instant invention substantially reduces time and expense involved in fabrication and assembly, thereby attaining material reductions in the overall costs of airplane production.

With the above and other objects in view, as will be apparent, this invention consists in the construction, combination and arrangement of parts all as hereinafter more fully described, claimed and illustrated in the accompanying drawings, wherein:

Fig. 1 is a plan view of an airfoil here illustrated as a wing, constructed in accordance with the present invention:

Fig. 2 is a corresponding plan view of the frame or skeleton of the airfoil or wing of the instant invention exposed by the removal of the skin:

Fig. 3 is a transverse section taken along line 3—3 of Fig. 1 to be read in conjunction with either Fig. 4 or Fig. 5 along lines A—A to disclose the complete sectional profile of the airfoil or wing at the points indicated for the sections of Figs. 4 and 5:

Fig. 4 is a transverse section taken along lines 4—4 of Fig. 1 to show the trailing edge construction and is to be joined with Fig. 3 along line A—A to establish the complete airfoil sectional profile between the aileron and the root end thereof:

Fig. 5 is a similar section taken along line 5—5 of Fig. 1 to illustrate the aileron construction and is to be joined with Fig. 3 along line A—A to disclose the complete airfoil profile section through the aileron:

Fig. 6 is a front elevation of the wing with parts of the skin broken away and in section to disclosed the skin structure, the interior frame or skeleton and the cooperation between the overlapped adjacent edges of the panels or sections of the skin:

Fig. 7 is a horizontal enlarged fragmentary section taken along line 7—7 of Fig. 3 to illustrate the construction of the root end-piece or rib of the airfoil and its cooperation with the several spars: and Fig. 8 is an enlarged fragmentary vertical section taken along line 8—8 of Fig. 3 to show the cooperation between the spar and the inboard or root end-piece or rib.

The present invention resides in an airfoil structure and the technique by which it may be produced and assembled, and is applicable to substantially all types of stationary or movable airfoils and control surfaces. For illustrative purposes it is shown and described as applied to a wing and coacting aileron, but it will be apparent that, with only minor modifications and changes necessitated by the character and size of the airfoil or control surface substantially the same structure can be employed for rudders, elevators, flaps, stabilizers, fins or any other airfoil or control surface.

Reference being had more particularly to the drawings, the basic frame or skeleton structure of the airfoil consists of two or more spars 10 and 10', the outer spars 10 being situated adjacent the leading and trailing edges of the airfoil, while the intermediate spar or spars 10' are located parallel to and between the outer spars 10. These spars 10 and 10' are identical in construction except where the inboard ends of the outer spars 10 may be used as fittings to attach or mount the wing or airfoil, as will be described. The intermediate spar or spars 10' are provided for additional strength and rigidity and unless required may be eliminated.

Coacting with and traversing the ends of the spars 10 and 10' are the end-pieces comprising the inboard rib 11 and the outboard rib 12. No intermediate ribs between the extremities of the airfoil are contemplated though it is of course possible to incorporate them in the airfoil construction following the teachings hereof. The ribs 11 and 12 not only serve as structural parts of the frame or skeleton of the airfoil but also are end-pieces closing the extremities thereof. Parallel to the ribs or end-pieces 12 and medially therebetween is situated a stub rib-section 13 which, in combination with the outboard rib 12, defines a space at the trailing edge of the airfoil or wing in which the aileron is situated. This stub rib-section 13 is constructed and made, except as to size, identically with the ribs 11 and 12 and also generally like the spars 10—10'.

The aileron mounted in the space defined by and between the outboard rib 12 and the stub rib-section 13 has a frame or skeleton comprising three ribs 14 spaced one from the other spanwise of the wing, the outer or end ribs 14 being respectively situated adjacent the rib 12 and the stub rib-section 13 while the other 14 is located centrally between said outer or end ribs. The frames thus described are the entire internal frame structure of the airfoil and of the aileron and the components thereof are individually made of sheet metal by using standard sheet metal techniques as will be hereinafter set forth.

Each of the spars 10—10' is constructed of sheet metal and comprises a relatively flat web 10'' of the required length, having transversely bent flanges 15 at both of its longitudinal edges thereby imparting U-section to the spars. Between its ends and between the flanges 15 the web of each spar is pierced by a series of lightening holes 16, the edges of which are bent outwardly at an angle to the body of the web to create the obliquely positioned, circular or conical flanges 17. Thus each spar is provided with a longitudinal flange at each of its longitudinal edges and with a series of annular conical flanges 17 intermediate of its edges and occurring periodically throughout its entire length, the flanges 15 projecting from one face of the web 10'' in opposition to the conical flanges 17 which project from the opposite face of the web. The flanges 15 at the longitudinal edges of the spar not only provide a means for mounting and securing the skin to the spars, as will be hereinafter more fully described, but also strengthens the spar through its entire length. The lightening holes 16 not only reduce the weight of the spar but the flanges 17 thereof add stiffness and strength thereto.

Regardless of the number of intermediate spars 10' employed, each is provided with a lateral flange 18 at each of its ends, to rest flush against and be secured to the inner surfaces of the ribs or end-sections 11 and 12 as will be hereinafter described. The flanges 18 also add strength and stiffness to the spar 10'. Each of the outer spars 10, at the point where it abuts or adjoins the outboard rib or end section 12, is also provided with a transverse end flange 19, similar to the end flanges 18 of the intermediate spar 10', to rest flush against the inner face of the outboard rib or end section 12 and be there secured as will be hereinafter more fully described. As in the case of the intermediate rib 10', the end flange 19 of the outer spars 10, in addition to providing means for attaching the spars 10 to the rib or end-section 12, also strengthens and stiffens them.

The end-sections or ribs 11—12 of the airfoil structure are substantially identical and each comprises a web 23 of shape and form to define the outline or contour of the ultimate airfoil, having a continuous lateral flange or lip 20 formed integrally at its edge. The web 23 is pierced by a series of lightening holes 21 each surrounded by an annular, conical flange 22. As shown in Fig. 7, the flanges 22 surrounding the lightening holes 21 project from one face of the web 23 while the continuous, integral flange 20 at the edge of the web projects from the opposite face thereof. The continuous flange 20 of each rib or end-section 11—12 and the conical flanges 22 surrounding the lightening holes 21 combine to strengthen and stiffen not only the rib or end-section per se but also impart strength and rigidity to the entire airfoil structure.

In assembly the spars 10—10' are positioned parallel one to the other with the end-sections or ribs 11—12 so traversing or crossing the opposed ends thereof that their respective flanges 20 project outwardly at the ends of the airfoil and away from the spars 10—10'. When so situated the end flange 18 of each intermediate spar and the end flanges 19 of the forward and aft spars 10—10' all rest flush against the inner face of the web 23 of the outboard rib or end section 12, where they are fixedly secured by rivets 23' or other suitable fastening means. As will be pointed out, the inner end-portions of the forward and aft spars 10 may pass through or may terminate at the inboard or root end-section or rib 11 and in either event they are rigidly and securely attached to the web 23 of said end-section or rib 11. Thus the main skeleton or frame of the airfoil consists of the spars 10 and, if desired, one or more intermediate spars 10', all rigidly secured at their ends to the end-sections or ribs 11—12 whereby a rigid, stiff frame structure is produced having the flanges 20 of the end-sections or ribs 11—12 projecting outwardly of the frame or skeleton structure so constituted.

As shown herein by way of example the inboard ends of outer spars 10 pass through slots 24 formed in the web 23 of the inboard end-section or rib 11 in alignment with the webs 10'' of the spars 10. The material from the slot 24 is only severed from the body of the web 23 along three sides of the slot so that it may be bent angularly to the web to create a lip 25 resting flush against one face of the web 10'' of the spar 10. An angle plate 26 approximately coextensive with the width of webs 10''—23 is so attached or secured to the web 23 of the end-section or rib 11 by the rivets or other fastening means 27 piercing the plate 26 and the web 23, that one of its arms 28 rests flush against the web 10'' of the spar 10 in opposition to the lip 25. Rivets or other suitable fastening means 29 pierce the arm 28 of the angle plate 26, the web of the spar 10'' and the lip 25 thereby rigidly securing these elements into a solid, unitary structure. While the formation of the slot 24 in the web 23 of the inboard end-section or rib 11 may possibly tend to weaken the rib or end-section at that point, the angle plate 26 secured to the web 23 of the end-section 11 and to the web 10" of the spar 10 and as well as to the lip 25 overcomes this weakness and results in a unitary structure as strong, if not stronger, than the web 23 would be without said opening or slot.

The web 10" of each spar 10 passes through the opening or slot 24 in the web 23 of the end-section or rib 11 to terminate beyond the limits of the flanges 20 of said rib or end-section, as illustrated in Figs. 2 and 7. In order to clear the flange 20 of the end-section 11 on both sides of the spar, the flanges 15 at the opposite edges of the spar are cut away as at 30. Thus the flanges 20 of the end-section or rib 11 are bridged or spanned by being received in the recesses 30 and the normal construction of the spar continues or is resumed in the portion 31 projecting beyond said end piece or rib. The projecting portion 31 of the spar 10 constitutes, if desired, a wing hinge fitting. An alternate structure readily suggests itself. To that end the spars 10 may terminate at the inner face of the web 23 of the end-section or rib 11 to be there secured by laterally formed end flanges exactly as the corresponding end of the intermediate spar 10' is secured to the web 23, in which event a wing hinge fitting 31 may be secured to the outer face of web 23 the rib or end-section 11 in alignment with the web 10" of the spar 10 by rivets or other suitable fastening means. Thus, instead of having the spar 10 projecting or passing through the web 23 of the rib 11, it may end at and be secured to one face of the web 23 of the rib while a hinge fitting 31 is secured to the opposite or outer face of said web in alignment therewith.

The stub rib-section 13 agrees in general shape, contour and length with those portions of the ribs or end-sections 11—12 which lie aft of the spar 10 situated adjacent the trailing edge of the airfoil structure. This stub section 13 comprises a web 13' having a laterally extending flange 13b at its outer edges similar to the flanges 20 of the end-sections or ribs 11—12. At its inner end the web 13' of the stub section 13 is provided with a laterally disposed flange or lip 13" which rests flush against the outer surface of the web 10" of the aft spar 10 to lie secured thereto by rivets or other suitable fastening means 13a. In this manner the stub rib-section 13 lies parallel to and is coextensive with the projecting end portions of the ribs or end pieces 11—12 located aft of the rear spar 10. The continuous lateral flange 13b, at the edge of the web 13' of the stub section 13 extends toward the end section or rib 12 and hence outwardly of that part of the trailing edge of the wing situated between said stub section and the inboard rib or end-section 11.

All of the elements hereinbefore described are formed from sheet metal with the lightening holes stamped therein with the conical flanges pressed to project outwardly from one face of the webs thereof and integral lateral flanges formed at the edges of the webs to project from the face thereof opposed to the conical flanges. The forming of these elements follows the conventional metal shaping technique in that each component is originally a flat metal sheet punched and formed in the conventional manner. No extensive or expensive machining or finishing operations of these formed sheet metal parts are required and, as will be seen, the assembly thereof in combination with the skin of the metal airfoil merely entails the use of standard fastening means, such as rivets, to complete the airfoil under most circumstances.

Over the frame thus formed of the spars 10—10' and the end-sections or ribs 11—12 is wrapped the skin of the airfoil which may be in the form of one or more sections or panels 32. This skin originates from a flat sheet of metal having the ribs 33 formed therein upon opposite sides of a central zone 34. These ribs 33, as shown in Fig. 3, extend in opposite directions on each side of the smooth central zone 34 toward the opposed edges of the sheet from which the skin panel is made. The sheet thus formed is then bent to envelope or wrap the frame so that the relatively smooth central zone 34 constitutes the leading edge of the airfoil while the sheet upon each side of said central zone comprises the upper and lower surfaces of the airfoil with the edges of the sheet at or adjacent the trailing edge of the airfoil. When the sheet is thus bent or wrapped around the frame the flat portions 35 thereof defined by the beads 33 rest flush against the laterally disposed flanges 15—20 respectively on the end sections or ribs 11—12 and spars 10—10'. Rivets 36 are then passed through the portions 35 of the panel and the flanges 15—20 at spaced intervals to secure the skin rigidly to the frame at all points where the portions 30 of the panel 32 contact and rest flush on said flanges. Since the flanges 20 and 13b respectively of the end sections or ribs 11—12 and the stub section 13 and the flanges 15 of the aft spar 10 project outwardly of the airfoil structure, rivets may easily be inserted in place then and headed without resorting to blind riveting.

In the adaptation of the invention shown herein, four sections or panels 32 of the skin are employed though it is to be understood that one or more panels 32 may be employed to wrap the internal frame with equal facility. When more than one panel 32 is employed the adjoining edges of the panels overlap as shown in Fig. 5 and are secured one to the other by the rivets 37. In that application of the invention shown herein, viz: adapted to a wing, the aileron spaces defined by the stub rib-section 13 and the projecting aft end of the end section or rib 12, necessitates shorter upper and lower skin surfaces. Therefore the two inboard skin panels 32 wrapped about the frame, as herein described, terminate aft of the rear spar 10 and are brought together as illustrated in Fig. 4. A metal strip or filler 38 is inserted between the then adjacent edges of the single sheet constituting the skin panel 32 and the edges of the skin panel and the metal strip or spacer 38 are secured together by the rivets 39. The upper and lower surfaces of the panels 32 of the skin aligned with the aileron terminate at and are secured to the flanges 15 of the rear or aft spar 10 as illustrated in Fig. 5. The upper flange 15 of the rear spar 10 coextensive with the space for the aileron is wider than the flange at the opposite edge of the spar 10 to provide for the mounting of one leaf 40 of a piano hinge by which the aileron is mounted for pivotal movement. In the example here shown, the leaf 40 is positioned against the under face of the wide flange 15 while the skin edge is positioned above said wide flange, the three elements then being secured together by a series of rivets 43. The opposite leaf 42 of the piano hinge is hinged to the leaf 40, as at 41, and carries the aileron structure as shown in Fig. 5 and as will be described.

The aileron or control surface 44 comprises two or more ribs 14 each having an outline to define the profile of the aileron or a movable control surface each provided at its edge with a lateral, integral flange 45. A single sheet of metal is wrapped around the ribs 14 and is attached to flanges 45 thereof by the rivets 46 passing through the flanges 45 and the metal sheet. The edges of this single sheet of metal are brought together at the leading edge of the upper surface of the aileron or airfoil to rest upon the leaf 42 of the hinge where they are secured by the rivets 47 passing through the hinge leaf 42 and the edges of the metal sheet. This airfoil is substantially triangular in cross-section and at its apex 48, which is the trailing edge thereof, the sides are integral one with the other and are brought together to bear upon the filler or spacer 49 to which the sides of the aileron are secured by the rivets or other fastening means 50. The upper and lower surfaces of the aileron or control surfaces are provided with the spaced beads 33' formed similarly to the beads 33 of the panels 32 and are aligned chordwise of the airfoil with the beads 33 of said panels.

The aileron or control surface 44 therefore comprises two or more ribs so wrapped or enveloped by a single metallic sheet that the edges of the sheet terminate one flush against the other at the leading edge of the aileron to rest flush upon the leaf 42 of the piano hinge 41. In this manner the aileron 44 is hingedly secured to the rear spar 10 for any required pivotal movement or adjustment.

What is claimed is:

1. An airfoil structure comprising unitary end-sections shaped to define its profile and close its ends, spars rigidly connected at their ends to said end-sections to form an internal frame, and a skin comprising a single metal sheet bent upon itself to rest flush against the outer edges of said end-sections and spars and having alternate flat and beaded portions, said skin being secured to both the end sections and spars and said beaded portions being interrupted at the leading edge of the airfoil and the breadth of said flat portions being substantially larger than the breadth of said beaded portions.

2. An airfoil structure comprising two sheet metal end ribs formed to define its contour, longitudinal spars interposed between and rigidly secured to said ribs within the limits of said ribs, said ribs and spars each having integral flanges projecting laterally from its edges, a single continuous metal sheet medially bent to envelope said ribs and spars and terminate at its edges adjoining the trailing edge of said airfoil structure, said sheet having spaced beads formed outwardly therein whereby portions of the sheet bounded by said beads rest flush against flanges of both ribs and spars, and means for securing those portions of said sheet located between said beads and resting flush against the flanges rigidly to the latter.

3. An airfoil comprising two spaced end-sections of sheet metal shaped to define the contour of the airfoil, parallel sheet metal spars spacing and secured to said end-sections and within the limits thereof, and a sheet metal skin bent over and attached to said end-sections thereby forming the leading edge of the airfoil and the upper and lower airfoil surfaces, said skin also being attached to said spars and having its rear edges joined and fastened together to form the trailing edge of the airfoil.

4. A movable airfoil comprising at least two roughly triangular ribs each having a continuous lateral flange at its edge, a skin formed from a single metal sheet enveloping said ribs to rest flush against and be secured to said flanges and having its edges brought together at the leading edge of the airfoil, and a hinge leaf secured to both the edges of the sheet forming the skin of the airfoil.

5. A movable airfoil comprising at least two roughly triangular ribs each having a flange at its edge, a skin formed from a single metal sheet enveloping said ribs and resting flush against and secured to flanges with its edges superposed and resting one against the other at the leading edge of the airfoil, and a hinge secured to the superposed edges of the sheet forming the skin of the airfoil.

6. An airfoil comprising an internal frame consisting of two transverse end-sections formed to define the profile of the airfoil and a longitudinal trailing edge strip, and a rigid skin formed from a single sheet of metal enveloping said end-sections and having a rear stiffening bend embracing the strip at the trailing edge of the frame, a lower stiffening bend about the leading edge of the airfoil, the edges of said sheet being brought into relative contact and projected in a direction away from the airfoil to combine to form a reinforced attachment flange, and integral beads formed in the skin between and substantially perpendicular to said bends.

7. A movable airfoil structure hinged at its leading edge comprising at least two roughly triangular ribs each having a continuous lateral flange at its edge, and a single metal sheet enveloping said ribs to rest flush against and be secured to the said flanges, the edges of the said sheet extending forwardly of and brought together at the upper leading edge of said airfoil to form a supporting ledge for the mounting of the airfoil structure.

8. An airfoil structure comprising two end ribs formed to define its contour, parallel spars extending between and rigidly secured to the said ribs and within the limits thereof, said ribs and spars each having a continuous laterally extending flange at its edges and a series of flanged openings formed in the body portion thereof, and a single metal sheet bent at its midpoint to form the leading edge of the airfoil structure, said sheet resting flush against and being secured to said ribs and spars and having relatively narrow raised beads formed in each side thereof and extending laterally of the structure at intervals substantially greater than the width of the said beads.

9. An airfoil comprising spaced sheet metal ribs formed to define its contour, three or more spars interposed between and rigidly secured to the said ribs, said ribs and spars each having flanges extending laterally from its edges, and a sheet metal skin formed to envelop the afore-mentioned ribs and spars and rigidly secured to the flanges thereof, said skin having transverse channels formed in the inner face thereof spaced one from the other at intervals substantially greater than the width of the said channels.

JOHN GITZ.
ALFRED Z. BOYAJIAN.

(References on following page)

REFERENCES CITED

The following references are of record in the file of this patent:

UNITED STATES PATENTS

| Number | Name | Date |
|---|---|---|
| 1,352,600 | Haskell | Sept. 14, 1920 |
| 1,554,326 | Black | Sept. 22, 1925 |
| 1,840,643 | Stout | Jan. 12, 1932 |
| 1,855,768 | Norquist | Apr. 26, 1932 |
| 1,877,022 | Northrop | Sept. 13, 1932 |
| 1,881,296 | Potez | Oct. 4, 1932 |
| 1,973,268 | Ragsdale | Sept. 11, 1934 |
| 2,019,272 | Ragsdale | Oct. 29, 1935 |
| 2,312,546 | Hazard et al. | Mar. 2, 1943 |
| 2,341,997 | Law et al. | Feb. 15, 1944 |